(12) United States Patent
Chen

(10) Patent No.: US 6,742,447 B1
(45) Date of Patent: Jun. 1, 2004

(54) DISC CUTTER FOR FRUIT AND VEGETABLE JUICE EXTRACTOR

(76) Inventor: Ming-Sung Chen, No. 9, Lane 471, Chung-Shan S. Rd., Yung-Kang City, Tainan Hsien (TW)

(\*) Notice: Subject to any disclaimer, the term of this patent is extended or adjusted under 35 U.S.C. 154(b) by 0 days.

(21) Appl. No.: 10/436,136

(22) Filed: May 13, 2003

(51) Int. Cl.[7] .............................. A23L 1/00; A23N 1/00; A23N 1/02; A47J 43/046; A47J 43/07
(52) U.S. Cl. .................................... 99/510; 99/631
(58) Field of Search ............ 99/492, 495, 509–513, 99/629–634; 366/601, 314, 297–300, 291; 241/37.5, 92, 282.1, 282.2; 494/36, 37, 43, 47, 10, 85; 426/61, 63, 49, 52, 533, 599, 640, 231, 233

(56) References Cited

U.S. PATENT DOCUMENTS

| | | | | |
|---|---|---|---|---|
| 3,848,524 A | * | 11/1974 | Semrow | 99/631 |
| 4,078,481 A | * | 3/1978 | Wunderlin | 99/510 |
| 4,335,650 A | * | 6/1982 | Prevot | 99/593 |
| 4,506,601 A | * | 3/1985 | Ramirez et al. | 99/510 |
| 4,681,031 A | * | 7/1987 | Austad | 99/510 |
| 5,495,795 A | * | 3/1996 | Harrison et al. | 99/492 |
| 5,924,357 A | * | 7/1999 | Chen | 99/511 |
| 6,397,736 B1 | * | 6/2002 | Tseng et al. | 99/511 |
| 6,543,340 B1 | * | 4/2003 | Fouquet | 99/511 |

\* cited by examiner

*Primary Examiner*—Timothy F. Simone
(74) *Attorney, Agent, or Firm*—Birch, Stewart, Kolasch & Birch, LLP

(57) ABSTRACT

A disc cutter for a fruit and vegetable juice extractor includes a disc body and a food disintegrating device. The disc body is rotatably mounted in the juice extractor has a top, a center and grinding blades. The grinding blades are radially formed in the top of the disc body for grinding food into juice. The food disintegrating device is attached to the top at the center of the disc body and includes a pointed body having a tapered top and two opposite edges. The tapered top has a central tip and a fluted land defined in the tapered top adjacent one of the edges. Therefore, the rotating pointed body will disintegrate efficiently the inserted food into several large pieces for the grinding blades to grind completely into juice without any food remaining on the pointed body.

3 Claims, 4 Drawing Sheets

US 6,742,447 B1

DISC CUTTER FOR FRUIT AND VEGETABLE JUICE EXTRACTOR

BACKGROUND OF THE INVENTION

1. Field of the Invention

The present invention relates to a disc cutter for a fruit and vegetable juice extractor, and more particularly to a disc cutter that has a food disintegrating device for reducing whole food without being cut such that the disc cutter will efficiently grind the divided food into juice from the fruit or vegetable.

2. Description of Related Art

A fruit and vegetable juice extractor typically has a disc cutter that is rotatably mounted in the fruit and vegetable juice extractor to slash the fruit and vegetable and transform them into juice. The disc cutter whirls at high speed for cutting and grinding the fruit or the vegetable. Generally, foods, such as whole carrots are inserted into the juice extractor via a feeding tube of the juice extractor that is located over the rotating disc cutter. The disc cutter typically has multiple tooth-like blades for grinding the fed foods as the disc cutter whirls at high speed.

With reference to FIG. 4, a conventional disc cutter for a fruit and vegetable juice extractor has a disc body (40), curved blades (41) and multiple tooth-like grinding blades (42). The disc body (41) has a top (not numbered) and a center (not shown). The grinding blades (42) are radially formed on the top of the disc body (40). Due to an arrangement of the grinding blades (42), a dead area of grinding (not shown), is formed at the center of the disc body (40). The food inserted into the juice extractor will not be efficiently ground at the dead area of grinding.

Therefore, the curved blades (41) are formed on the top at the center of the disc body (40) and protrude radiantly from the top of the disc body (40) for grinding the food over the dead area of grinding. However, though the disc cutter is rotated at a high speed for grinding, force of grinding of the curved blades (42) still cannot be very effective. Thus, the inserted food will be incompletely transformed into juice by grinding.

To overcome the shortcomings, the present invention provides an improved disc cutter for a fruit and vegetable juice extractor to mitigate or obviate the aforementioned problems.

SUMMARY OF THE INVENTION

The main object of the invention is to provide an improved disc cutter for a fruit and vegetable juice extractor, and the disc cutter has a food disintegrating device that will efficiently reduce whole food inserted into the juice extractor such that the disc cutter will completely grind the food in the fruit and vegetable juice extractor to extract juice.

To achieve the object, the disc cutter comprises a disc body and a food disintegrating device. The food disintegrating device is attached to a center of the disc body and comprises a pointed body. The pointed body is S-shaped and has a tapered top and two opposite edges. The tapered top has a central tip and a fluted land defined in the tapered top adjacent to one of the edges of the pointed body. Consequently, when the disc cutter whirls at high speed, the rotating pointed body, like a drill bit, will pierce easily and reduce the inserted food. The divided food will be completely ground by the disc cutter because the disc cutter always rotates at a high speed.

Other objects, advantages and novel features of the invention will become more apparent from the following detailed description when taken in conjunction with the accompanying drawings.

DETAILED DESCRIPTION OF PREFERRED EMBODIMENT

Figure 1:
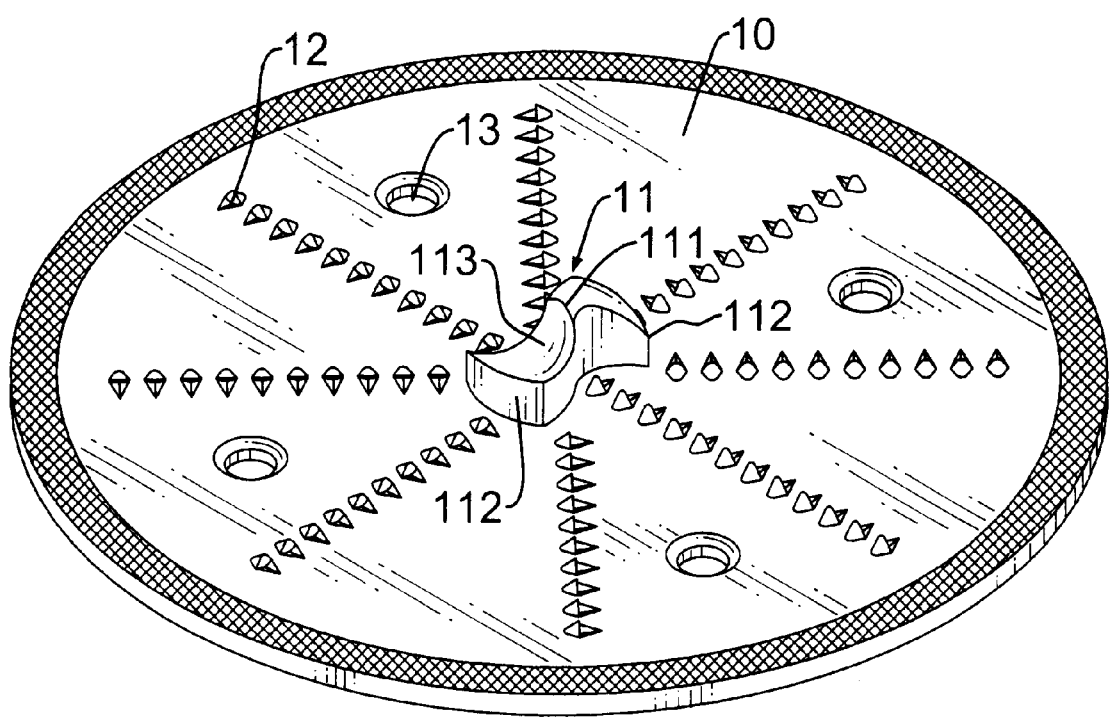
FIG. 1 is a perspective view of a disc cutter in accordance with the present invention.
Figure 2:
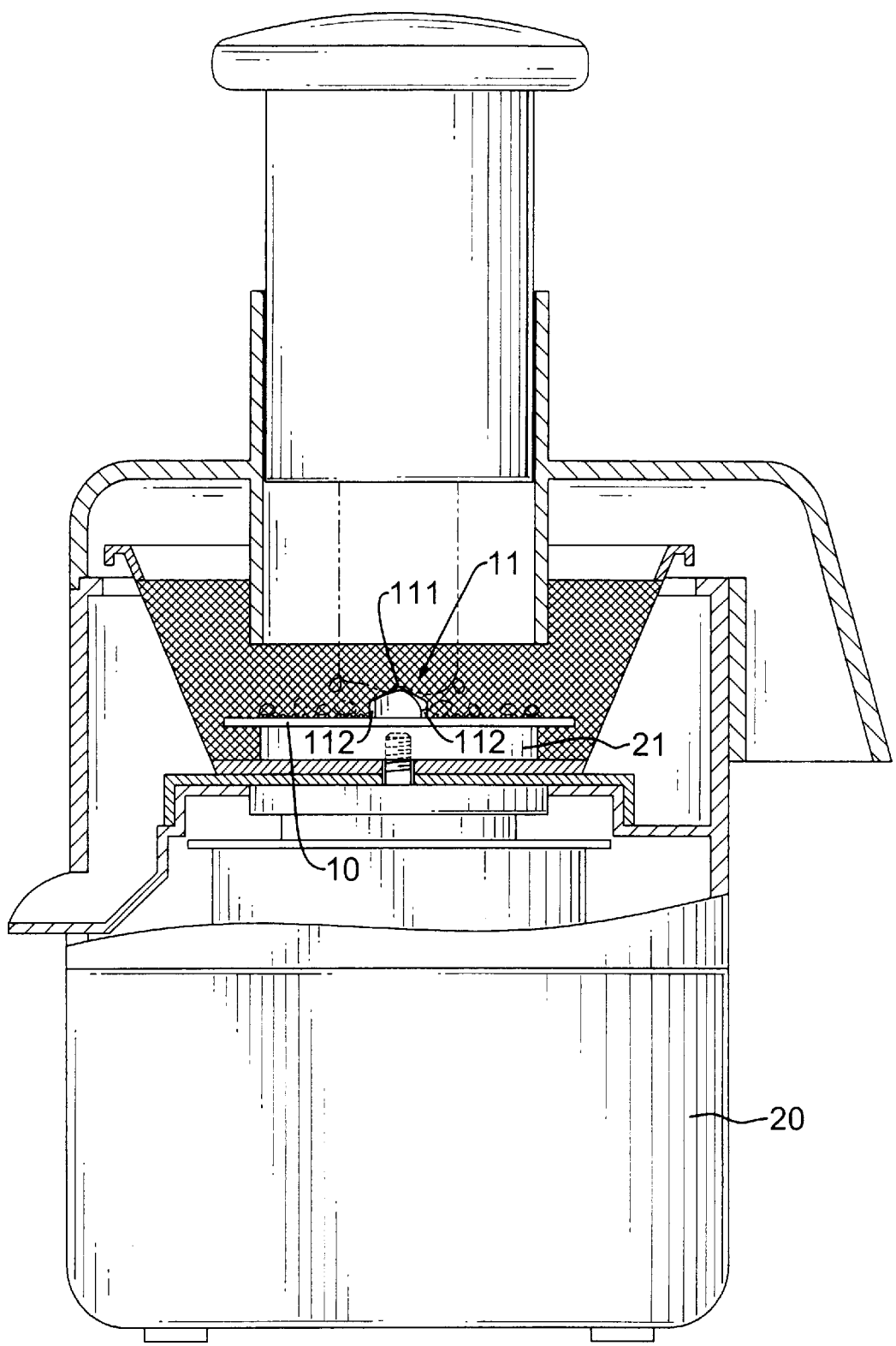
FIG. 2 is an operational side plan view of the disc cutter in FIG. 1 when the disc cutter is mounted in a fruit and vegetable juice extractor.

With reference to FIGS. 1 and 2, a disc cutter for a fruit and vegetable juice extractor (20) comprises a disc body (10) and a food disintegrating device (11). The disc body (10) has a top (not numbered), a center (not shown), tooth-like grinding blades (12) and mounting holes (13). The grinding blades (12), are conventional and radially formed on the top of the disc body (10) for grinding food, such as fruits or vegetables to transform the food into juice. The mounting holes (13) are radially and equidistantly defined through the disc body (10) such that the disc cutter can be mounted on a rotating disc (21) of the fruit and vegetable juice extractor (20) by means of bolts (not shown) or the like.

The food disintegrating device (11) is attached to the top center of the disc body (10) for eliminating the dead area of grinding, as previously described and comprises a pointed body (not numbered). The pointed body is substantially S-shaped and has a tapered top (not numbered) and two opposite edges (112). The tapered top has a central tip (111) and a fluted land (113). The fluted land (113) is defined in the tapered top adjacent one of the edges (112) of the pointed body. Therefore, when the disc cutter is rotatably mounted in the fruit and vegetable juice extractor (20), a piece of food (not shown) that is inserted into the fruit and vegetable juice extractor (20) via a feeding tube (not numbered) will be pushed toward the disc cutter that whirls at high speed. The food will be ground by the grinding blades (12) except a portion of the food over the food disintegrating device (11). The central tip (111) of the rotating pointed body will initially make a hole in the piece of food, and quickly reduce the food into several divided pieces. The operation of the pointed body is like a drill bit making a hole in a work piece. The divided food pieces will be pushed over the top of the disc body (10) by the centrifugal force caused by the whirling disc body (10) and the grinding blades (12) will grind the divided food into juice. No solid food will remain in the food disintegrating device (11) because the divided food will be drawn along the radial direction of the rotating pointed body and be ground by the grinding blades (12).

Figure 3:
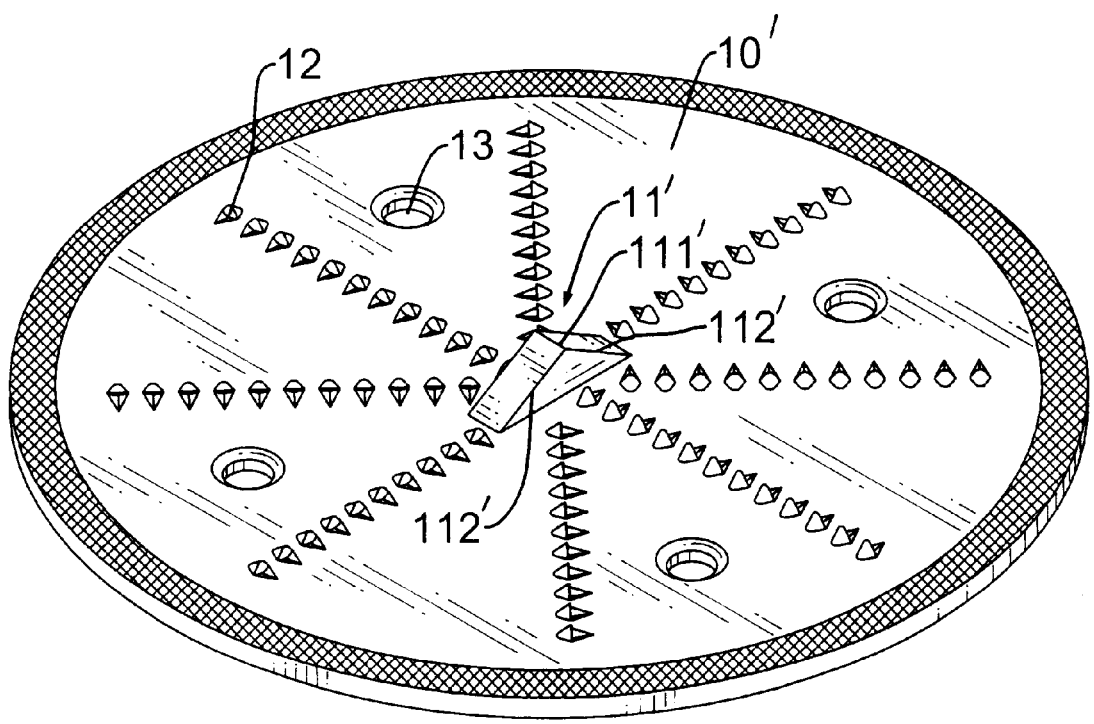
FIG. 3 is a perspective view of an alternative embodiment in accordance with the present invention.
Figure 4:
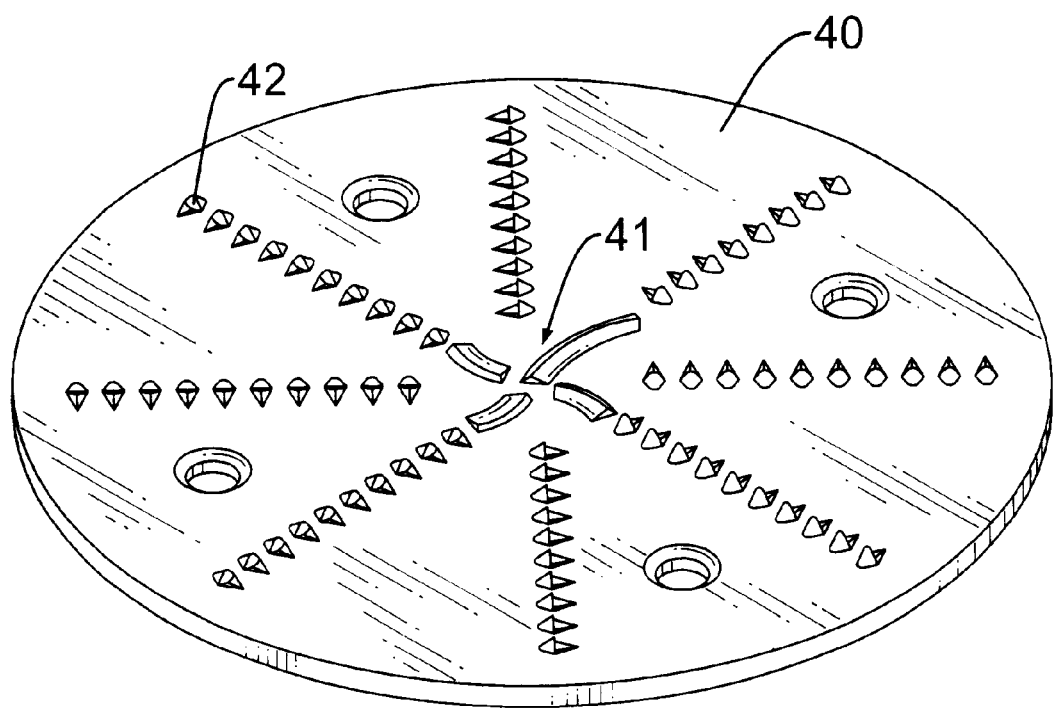
FIG. 4 is a perspective view of a disc cutter in accordance with the prior art.

With reference to FIG. 3, an alternative embodiment of the present invention has a disc body (10') having grinding blades (12) and mounting holes (13) as previously described and a food disintegrating device (11'). Similarly, the food disintegrating device (11') has a pointed body (not numbered) that is attached to the top at the center of the disc body (10'). The pointed body is triangular and has a tapered-top (not numbered) and two opposite inclined edges (112').

The tapered top of the pointed body has a central tip (111'). The inclined edges (112') are formed in the tapered top corresponding to each other for forming the central tip (111'). Likewise, the central tip (111') and the inclined edges (112') will disintegrate efficiently the inserted food into several divided large pieces without any food remaining on the pointed body.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A disc cutter for a fruit and vegetable juice extractor and the disc cutter comprising:

a disc body having a top and a center;

multiple mounting holes defined radially through the top of the disc body;

multiple grinding blades formed on the top of the disc body; and a food disintegrating device attached to the top at the center of the disc body and the food disintegrating device comprising a pointed body having a tapered top projecting substantially centrally upwardly and two opposite edges; and a central tip formed on the tapered top of the pointed body.

2. The disc cutter as claimed in claim 1, wherein the pointed body is S-shaped and further has a fluted land formed in the tapered top of the pointed body adjacent one of the edges of the pointed body.

3. The disc cutter as claimed in claim 1, wherein the pointed body is triangular and has two inclined edges formed corresponding to each other for forming the central tip.

* * * * *